US010433299B2

(12) United States Patent
Jin et al.

(10) Patent No.: US 10,433,299 B2
(45) Date of Patent: Oct. 1, 2019

(54) CONTROLLER FOR ALLOCATING RADIO RESOURCE BLOCKS TO USER DEVICES LOCATED IN CELLS OF A CELLULAR NETWORK

(71) Applicant: Kabushiki Kaisha Toshiba, Minato-ku (JP)

(72) Inventors: Yichao Jin, Bristol (GB); Fengming Cao, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 75 days.

(21) Appl. No.: 14/894,422

(22) PCT Filed: May 29, 2013

(86) PCT No.: PCT/GB2013/051419
§ 371 (c)(1),
(2) Date: Nov. 27, 2015

(87) PCT Pub. No.: WO2014/191704
PCT Pub. Date: Dec. 4, 2014

(65) Prior Publication Data
US 2016/0128041 A1 May 5, 2016

(51) Int. Cl.
*H04W 72/04* (2009.01)
*H04W 52/24* (2009.01)
(Continued)

(52) U.S. Cl.
CPC ......... *H04W 72/044* (2013.01); *H04W 16/30* (2013.01); *H04W 52/243* (2013.01);
(Continued)

(58) Field of Classification Search
CPC ............... H04W 72/044; H04W 16/10; H04W 72/0473; H04W 72/082
See application file for complete search history.

(56) References Cited

U.S. PATENT DOCUMENTS 7,230,991 B2 6/2007 Sang et al.
7,392,055 B2 6/2008 Li et al.
(Continued)

FOREIGN PATENT DOCUMENTS

JP 2013-516122 A 5/2013
WO WO 2011/148836 A1 12/2011
WO WO 2012/114704 A1 8/2012

OTHER PUBLICATIONS

Shannon, Claude "A Mathematical Theory of Communication". Bell System Technical Journal p. 623-656 (Year: 1948).*

(Continued)

*Primary Examiner* — Jeffrey M Rutkowski
*Assistant Examiner* — Basil Ma
(74) *Attorney, Agent, or Firm* — Oblon, McClelland, Maier & Neustadt, L.L.P.

(57) ABSTRACT

A controller for allocating a radio resource block to a user device in a cell of a cellular network, includes a device for identifying a plurality of edge user devices within range of a first base station, a device for identifying, from the plurality of edge user devices, a first edge user device with which the first base station intends to communicate and a second edge user device presently communicating with a second base station in a neighboring cell, and a device for allocating a communication channel to the first edge user device by assigning a resource block for communications between the first edge user device and first base station. The resource block is one that will provide the highest transmission rate for the first edge user device, while differing from any resource blocks already allocated for communication between the second edge user device and the second base station.

15 Claims, 10 Drawing Sheets

(51) Int. Cl.
  *H04W 16/30* (2009.01)
  *H04W 16/10* (2009.01)
  *H04W 72/08* (2009.01)
(52) U.S. Cl.
  CPC ..... *H04W 72/048* (2013.01); *H04W 72/0473* (2013.01); *H04W 16/10* (2013.01); *H04W 72/082* (2013.01)

(56) References Cited

U.S. PATENT DOCUMENTS

| | | | |
|---|---|---|---|
| 2009/0201867 A1* | 8/2009 | Teo | H04L 5/0037 370/329 |
| 2009/0296574 A1 | 12/2009 | Liao et al. | |
| 2010/0197314 A1* | 8/2010 | Maaref | H04W 16/04 455/450 |
| 2011/0312360 A1 | 12/2011 | Madan et al. | |
| 2012/0122503 A1* | 5/2012 | Ma | H04W 16/10 455/501 |
| 2012/0244871 A1* | 9/2012 | Zhao | H04W 16/10 455/452.1 |
| 2012/0252470 A1 | 10/2012 | Wong et al. | |
| 2013/0072246 A1 | 3/2013 | Nobukiyo et al. | |

OTHER PUBLICATIONS

International Search Report dated May 23, 2014 in PCT/GB2013/051419.

International Preliminary Report on Patentability and Written Opinion dated Dec. 1, 2015 in PCT/GB2013/051419.

Yohei Umeda, et al., "Efficient Adaptive Frequency Partitioning in OFDMA Downlink with Fractional Frequency Reuse" 2011 International Symposium on Intelligent Signal Processing and Communication Systems (ISPACS), XP032114761, Dec. 2011, 5 Pages.

Bin Fan, et al., "A Dynamic Resource Allocation Scheme Based on Soft Frequency Reuse for OFDMA Systems" IEEE 2007 International Symposium on Microwave, Antenna, Propagation, and EMC Technologies for Wireless Communications, XP031167523, 2007, pp. 1-4.

Office Action dated Nov. 15, 2016 in Japanese Patent Application No. 2016-516229.

Luca Venturino, et al., "Coordinated Scheduling and Power Allocation in Downlink Multicell OFDMA Networks", IEEE Transactions on Vehicular Technology, vol. 58 No. 6, Jul. 2009, pp. 2835-2848.

Harold J. Kushner, et al., "Convergence of Proportional-Fair Sharing Algorithms Under General Conditions", IEEE Transactions on Wireless Communications, vol. 3 No. 4, Jun. 2003, pp. 1-23 with cover page.

Bo Yang, et al., "Heuristic Resource Allocation for Multiuser OFDM Distributed Antenna System with Fairness Constraints", ICCTA '09 IEEE International Conference on Communications Technology and Applications, 2009, pp. 91-95.

ChiSung Bae, et al., "Fairness-Aware Adaptive Resource Allocation Scheme in Multihop OFDMA Systems", IEEE Communications Letters, vol. 11 No. 2, Feb. 2007, pp. 134-136.

Yoshihisa Kishiyama, Initial consideration on wireless interface using nonorthogonal multiple access for future radio access, Technical research report of the Institute of Electroncis, Information and Communications RCS2011-81, Jul. 14, 2011—along with a machine-generated English translation.

Nagisa Otao et al., "Performance of Transmission Power Allocation for Non-orthogonal Access with SIC in Cellular Downlink", 2012 Society of Electronics, Information and Communication Engineers Society Convention, Presentation Paper B-5-14, Aug. 28, 2012, 6 pages (unedited computer generated English translation only).

Atsushi Nagate et al., "A Study on Power Reallocation Method in Multi-cell Coordinated Power Control", 2009 Comprehensive Meeting of the Institute of Electronics Information and Communication, Presentation Paper B-5-10, Mar. 4, 2009, 6 pages (unedited computer generated English translation only).

* cited by examiner

Fig. 1

| Algorithm 1 The RRM algorithm |
|---|
| 1: % Calculate user utility on all available RBs % |
| 2: for each cell $j \in M$ do |
| 3:     for each user $U_i$ in $j^{th}$ cell do |
| 4:         if $U_{i,j} \in U^e$ then |
| 5:             $L^e \leftarrow \{R_{i,j}^k | k = 1, 2, \ldots N\}$ |
| 6:         else |
| 7:             $L^c \leftarrow \{R_{i,j}^k | k = 1, 2, \ldots N\}$ |
| 8:         end if |
| 9:     end for |
| 10: end for |
| 11: % First assign RBs to cell edge users % |
| 12: $No_e$ = total number of $U^e$ |
| 13: for each edge user $U_{i^*,j^*} \in U^e$ do |
| 14:     INITIALIZE $L^*$ ($L^* \in L^e$) |
| 15:     INITIALIZE $\sigma$ |
| 16:     while $\sigma > 0$ % each user have at least $\sigma$ RBs % do |
| 17:         % Find the best RB $k^*$ for $U_{i^*,j^*}$ |
| 18:         $R_{i^*,j^*}^{k^*} = \max(L^*)$ |
| 19:         if $j^* \notin U^{inf}$ of any other cells using the same RB $k^*$ then |
| 20:             ASSIGN $k^*$ to $U_{i^*,j^*}$ |
| 21:             $\sigma = \sigma - 1$ |
| 22:         end if |
| 23:         REMOVE $R_{i^*,j^*}^{k^*}$ from $L^*$ |
| 24:         if $L^* = \emptyset$ % No staggered RB can be found % then |
| 25:             INITIALIZE $L^*$ |
| 26:             ASSIGN the best RB $R_{i^*,j^*}^{k^*} \in L^*$ to the user. |
| 27:         end if |
| 28:     end while |
| 29: end for |
| 30: ASSIGN $\sigma$ RBs to each cell central user (repeat line 12-29 for $U^c$) |
| 31: ASSIGN $(N - \sigma \times \Omega)$ RBs to users with max utility $\max(L^e \bigcup L^c)$ |

| Power level ($C_2 - U_2^C$) | Line style | Utility ($U_1^e$) | Utility ($U_2^C$) | Utility ($U_3^e$) | F ($\alpha = 0.5$) |
|---|---|---|---|---|---|
| 1 | —··—··— | 0 | 18 | 1 | 6 |
| 2 | — — — — | 5 | 15 | 4 | 10 |
| 3 | ············ | 7 | 10 | 6 | 11 |
| 4 | ———— | 8 | 3 | 7 | 8 |

CONTROLLER FOR ALLOCATING RADIO RESOURCE BLOCKS TO USER DEVICES LOCATED IN CELLS OF A CELLULAR NETWORK

FIELD

Embodiments described herein relate to controller for allocating radio resource blocks to user devices located in cells of a cellular network.

BACKGROUND

In order to cope with high data rate next-generation wireless services, macro cellular cells are usually split into smaller size cells such as picocells and femtocells, helping to increase the spectrum utilization as well as the total system capacity. In such systems, adjacent cells may share the same radio frequency in order to achieve high spectrum efficiency. However, this can give rise to inter-cell interference (ICI).

Inter-cell interference is a particularly serious problem in future small base station scenarios, due to the large number of deployed small cells and their overlapping coverage areas. Without a proper resource allocation method, cell edge users CEUs (i.e. those users who are located close to the edge of a cell's area of geographic coverage) may experience severe interference from neighbouring cells, significantly decreasing the edge user throughput and even resulting in user outage.

Previous approaches for overcoming the ICI problem have focused mainly on the maximization of sum capacity, whereby a cell centre user CCU (i.e. a user who is not located close to the boundary with another cell) having a high throughput is given higher priority when allocating spectrum resources. Nevertheless, user fairness needs to be considered such that reliable services for users at the boundary of the cell (CEU) can be guaranteed.

Fractional frequency reuse (FFR) is another technique to address the ICI problem. In FFR, the numbers of allocated channels (subcarriers or resource blocks) for CEUs and CCUs are independently predetermined for every single adjacent cell. Each cell then assigns a different subset of channels to their cell edge users. In FFR, such a fraction of dedicated channels are reserved for cell edge users in order to achieve a good cell-edge performance. Doing so, however, results in low spectrum efficiency and mat significantly reduce the total cell throughput as these channel resources cannot be reused by cell centre users of the adjacent cells. Soft Frequency Reuse (SFR), on the other hand, uses different subcarrier power levels for CCUs and CEUs, where a low power is used for CCUs and a high power is used for CEUs. As a result, the SFR achieves higher spectrum efficiency than the FFR.

In addition, other techniques such as Proportional Fair (PF) scheduling have been proposed for maximizing the total cell throughput, while allowing all users at least a minimal level of service.

Although techniques such as PF, FFR and SFR consider both user fairness and aggregated user throughput, most of the proposed algorithms cannot guarantee the throughput of cell edge users. It is also desirable that the transmission power of each subcarrier in the respective cells should be allocated optimally for the given set of users, which is not the case when using these techniques.

It follows that there is a need to provide techniques for distributing radio resources fairly between users, whilst helping to ensure the throughput of cell edge users.

DETAILED DESCRIPTION

According to a first embodiment, there is provided a method of allocating a radio resource block to a user device located in a cell of a cellular network, the cell having a first base station, the method comprising:
 identifying a plurality of edge user devices that are within range of the first base station, the edge user devices being ones located at an edge region of the cell;
 identifying, from the plurality of edge user devices, a first edge user device with which the first base station intends to communicate and a second edge user device that is presently communicating with a second base station located in a neighbouring cell;
 allocating a communication channel to the first edge user device by assigning a resource block for communications between the first edge user device and the first base station,
 wherein the resource block that is assigned is selected as being the one that will provide the highest transmission rate for the first edge user device, whilst differing from any resource blocks already allocated for communication between the second edge user device and the second base station.

In some embodiments, the second edge user device is one of a plurality of second identified edge user devices that are within range of the first base station and presently communicating with base stations located in neighbouring cells. The resource block that is assigned for communication between the first edge user device and the first base station may be selected as being the one that will provide the highest transmission rate for the first edge user device, whilst differing from any resource blocks already assigned for communication between the second edge user devices and the respective base stations with which the second edge user devices are presently communicating.

In some embodiments, the first edge user device is one of a plurality of first identified edge user devices within range of the first base station and with which the first base station intends to communicate. In such embodiments, the method may comprise:
  allocating a communication channel to each of the first edge user devices by assigning a respective resource block for communications between each first edge user device and the first base station;
  wherein for each of the first edge user devices, the resource block that is assigned is selected as being the one that will provide the highest transmission rate for the user device in question, whilst differing from any resource blocks already allocated for communication between the second edge user devices and the respective base stations with which the second edge user devices are presently communicating.

In some embodiments, each of the first edge user devices is assigned a plurality of resource blocks in turn. In some embodiments, for each first user device, the resource blocks are chosen in turn, each block being chosen as the one that will provide the greatest increase in transmission rate for the first edge user device whilst differing from any resource blocks already assigned for communication between the second edge user devices and the base stations with which the second edge user devices are presently communicating.

In some embodiments, each one of the first devices is first assigned the same minimum number of resource blocks, and thereafter, any remaining available resource blocks are assigned to those devices located in the cell that will yield the highest net transmission for the cell.

In some embodiments, the second edge user devices are identified as those devices for which the difference in power received from the respective base station with which they are presently communicating and the power received from the first base station is below a predetermined threshold level.

According to a second embodiment, there is provided a method of mitigating interference experienced by a user device in a cellular network, the method comprising:
  allocating a communication channel to a first user device located in a cell of the network by assigning a resource block for communications between the user device and a first base station that serves the cell;
  identifying at least one other user device that is located in an edge region of the cell and which is presently communicating with a second base station located in a neighbouring cell using the same resource block; and
  adjusting the power of transmissions between the first user device and the first base station so as to reduce the interference caused by the transmissions at the at least one other user device.

In some embodiments, the power of transmission between the first user device and the first base station is varied through a plurality of levels. For each level, a performance criterion may be determined, the performance criterion being based on the transmission rates of each user device presently within range of the first base station. The method may comprise selecting the power level that results in the best value for the performance criterion.

In some embodiments, the power of transmission is varied incrementally from a maximum value to a minimum value. At each power level, the performance criterion may be determined at least in part based on the mean transmission rate of each user device presently within range of the first base station. The performance criterion may be determined at least in part based on the transmission rate of the user device having the lowest transmission rate of all user devices presently within range of the first base station. The performance criterion may comprise a weighted sum of the mean transmission rate of each user device presently within range of the first base station and the transmission rate of the user device having the lowest transmission rate of all user devices presently within range of the first base station.

In some embodiments, each resource block is a sub-carrier in an OFDM system.

According to a third embodiment, there is provided a method comprising the steps of the first and second embodiments.

According to a fourth embodiment, there is provided a controller for allocating a radio resource block to a user device located in a cell of a cellular network, the cell having a first base station, the controller comprising:
  means for identifying a plurality of edge user devices that are within range of the first base station, the edge user devices being ones located at an edge region of the cell;
  means for identifying, from the plurality of edge user devices, a first edge user device with which the first base station intends to communicate and a second edge user device that is presently communicating with a second base station located in a neighbouring cell;
  means for allocating a communication channel to the first edge user device by assigning a resource block for communications between the first edge user device and the first base station,
  wherein the means for allocating is configured to select the resource block that will provide the highest transmission rate for the first edge user device, whilst differing from any resource blocks already allocated for communication between the second edge user device and the second base station.

According to a fifth embodiment, there is provided a controller for controlling the power of transmissions between a base station and a user device in a cellular network, the controller comprising:
  means for allocating a communication channel to a first user device located in a cell of the network by assigning a resource block for communications between the user device and a first base station that serves the cell;
  means for identifying at least one other user device that is located in an edge region of the cell and which is presently communicating with a second base station located in a neighbouring cell using the same resource block; and
  means for adjusting the power of transmissions between the first user device and the first base station so as to reduce the interference caused by the transmissions at the at least one other user device.

According to a sixth embodiment, there is provided a controller having the features of both the fourth and fifth embodiments.

According to a seventh embodiment, there is provided a non-transitory computer readable storage medium comprising computer executable instructions that when executed by a computer will cause the computer to implement a method according to any one of the first, second or third embodiments.

Figure 1:
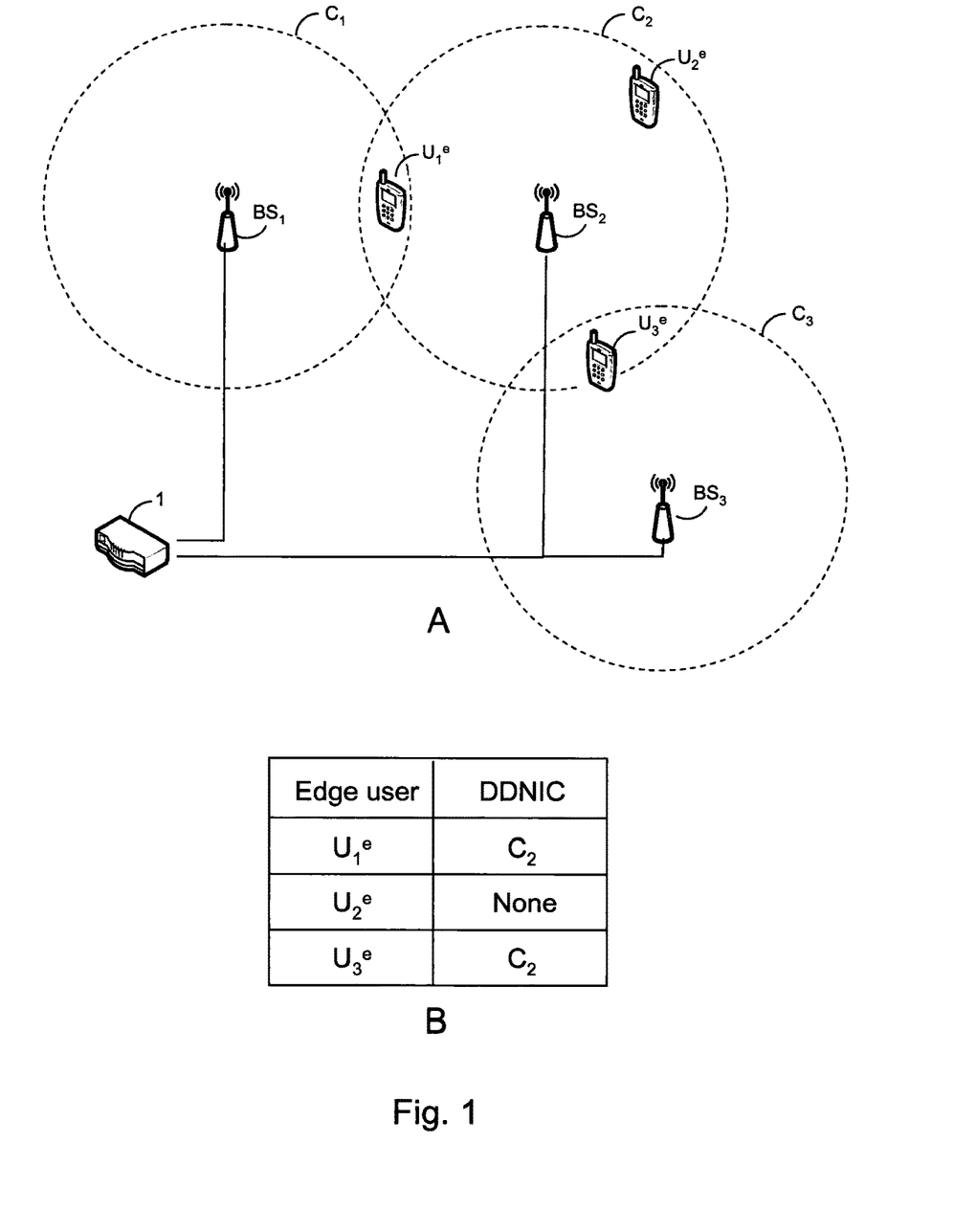
FIG. 1A shows an example of a cellular network for use in explaining an embodiment.
FIG. 1B shows a table listing the Dominant Downlink Neighbouring Interfering Cells (DDNICs) for each of the user devices shown in FIG. 1B.

FIG. 1A shows a section of a cellular network, comprising 3 cells $C_1$, $C_2$ and $C_3$, each of which is served by a respective base station $BS_1$, $BS_2$, and $BS_3$. A controller 1 is used to coordinate transmissions from each cell's base station to the user devices located in that cell. A first user device, $U_1^e$ is located at the edge of cell $C_1$ and is allocated a channel for communicating with that cell's base station $BS_1$. A second user device $U_2^e$ is located in the second cell $C_2$ and is allocated a channel for communicating with the base station $BS_2$ in that cell, whilst a third user device $U_3^e$ located in the cell $C_3$ is allocated a channel for communicating with the base station $BS_3$.

Due to the overlap between the cells $C_1$ and $C_2$, the user device $U_1^e$ is liable to experience interference from the second cell $C_2$ when the base station $BS_2$ broadcasts on similar frequencies to those allocated for communication between the user device $U_1^e$ and the base station $BS_1$ in cell $C_1$. The same also applies in respect of the third user device $U_3^e$, which will experience interference when frequencies used by the second base station $BS_2$ are similar to those allocated for communication between the third user device $U_3^e$ and the base station $BS_3$ in cell $C_3$. In order to avoid such experience, a proper resource allocation mechanism is required.

Embodiments described herein seek to mitigate downlink interference by properly allocating radio resources to users and/or through adaptive power assignment in multi-channel systems. Each channel may be a Resource Block (RB) in LTE or WiMAX systems or a subcarrier in an OFDM-based system. In the following, the term "Resource Block" can be understood to represent a channel or a group of one or more subcarriers.

A first embodiment will now be described in which radio resources are allocated in such a way as to mitigate inter-cell interference and avoid edge user outage, whilst still improving downlink user fairness. Here, the allocation of N resource blocks RBs to the user devices in M cells is modelled by an M-by-N matrix U. Each element in the matrix U stands for an available resource block in a cell that needs to be assigned to a user device. Multiple resource blocks RBs may be assigned to the same user device UE. Each small cell is assumed to have a finite number of resource blocks (RBs) representing the available spectrum, and a number of user devices (UEs) randomly distributed within the cell's area of geographic coverage.

The present embodiment provides an algorithm that can operate on the matrix U to determine a resource allocation that is optimised in terms of both user fairness and average cell throughput. Since cell edge users tend to have low SINR and are more likely to suffer interference from adjacent cells, an edge user prioritized scheme is used, whereby edge users ($U^e$) are given a higher priority when allocating resource blocks than central users ($U^C$) in order to achieve better user fairness.

In the present embodiment, edge user devices are identified by comparing the signal power received by the device from two or more neighbouring base stations. For each edge user i that is liable to experience interference from a neighbouring cell, the following condition will apply:

$$Rp_i^i - Rp_i^j < \gamma \quad \text{(Equation 1)}$$

Here, $Rp_i^i$ is the received power from the device's presently serving cell, $Rp_i^j$ is the received power from the base station of neighbouring cell j and $\gamma$ is a pre-defined threshold value. (Note that, for cell centre users, the reverse will be true i.e. $Rp_i^i - Rp_i^j \geq \gamma$).

Moreover, if the difference between $Rp_i^i$ and $Rp_i^j$ is less than a pre-defined threshold $\gamma$, then it also follows that the neighbouring cell j is one of the Dominant Downlink Neighbouring Interfering Cells (DDNICs) for the user i (i.e. $j \in U_i^{inf}$ where $U_i^{inf}$ is the set of cells determined as being DDNICs for the user device in question). The above method of establishing which of the neighbouring cells are DDNICs is presented here by way of example only; the person skilled in the art will understand that other methods besides that described above can also be used to determine which cells are DDNICs, for example, by determining the SINR of the user with or without interference from a given neighbouring cell.

In the present embodiment, a resource assignment constraint is used to guarantee that a minimum number of resources are assigned to each user, thereby providing a minimum level of service for each user. The constraint is shown in Equation 2:

$$\Sigma r_i \geq \sigma \quad \text{(Equation 2)}$$

where $r_i$ is the number of resource blocks assigned to the $i^{th}$ user device and $\sigma$ is the minimum number of resource blocks that shall be assigned to each user. The value of $\sigma$ is obtained as follows:

$$\sigma = \text{Min}\left(\tau, \left\lfloor \frac{N}{\Omega_j} \right\rfloor\right) \quad \text{(Equation 3)}$$

Here, $\tau$ is the total number of available resource blocks that can be equally assigned to all edge users, whilst $\Omega_j$ is the total number of users at the $j^{th}$ ($j \in M$) cell. The value of $\tau$ needs to satisfy the condition that if an edge user is located in another edge user's DDNIC, different resources or subcarriers must be assigned to those edge users.

After assigning a number of RBs equal to the value of $\sigma$ to each user, the remaining available RBs ($N-\sigma \times \Omega_j$) are then allocated to those centre users who have a relatively high data rate in order to increase the total cell throughput.

FIG. 1B shows the DDNICs for the scenario shown in FIG. 1A. Here, the cell $C_2$ is determined as being a DDNIC for the edge users $U_1^e$ and $U_3^e$, both of which are within range of the base station $BS_2$. The edge user $U_2^e$ meanwhile does not have a DDNIC as it is within range of its own serving base station $BS_2$ only.

A cell that is a DDNIC for another cell should avoid assigning a resource block to an edge user where that other cell has already assigned the same resource block to its own edge user. This can be understood by reference to FIG. 1A. Here, the controller 1 recognises that cell $C_2$ is a DDNIC for the edge user $U_1^e$ in cell $C_1$ and also for the edge user $U_3^e$ in cell $C_3$. Therefore, when allocating a sub-carrier or resource block for communication between the base station $BS_2$ and the user device $U_2^e$, the controller 1 should ensure that the resource allocated is different from ones already allocated for communication between $U_1^e$ and $U_3^e$ and their respective base stations $BS_1$ and $BS_3$. Note that in the example shown in FIG. 1, the edge users $U_1^e$ and $U_3^e$ could both be allocated the same resource block, as cell $C_1$ is not a DDNIC for $U_3^e$ and cell $C_3$ is not a DDNIC for $U_1^e$.

Figure 2:
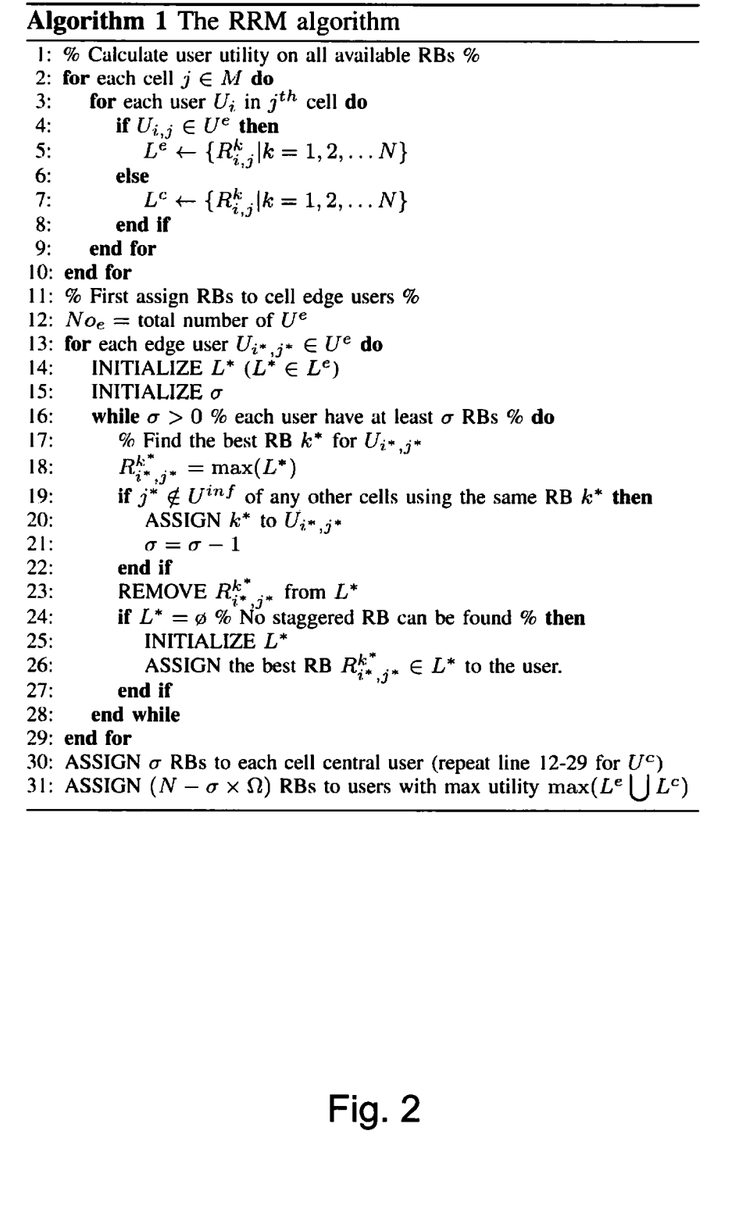
FIG. 2 shows an example of an algorithm suitable for implementing an embodiment.
Figure 3:
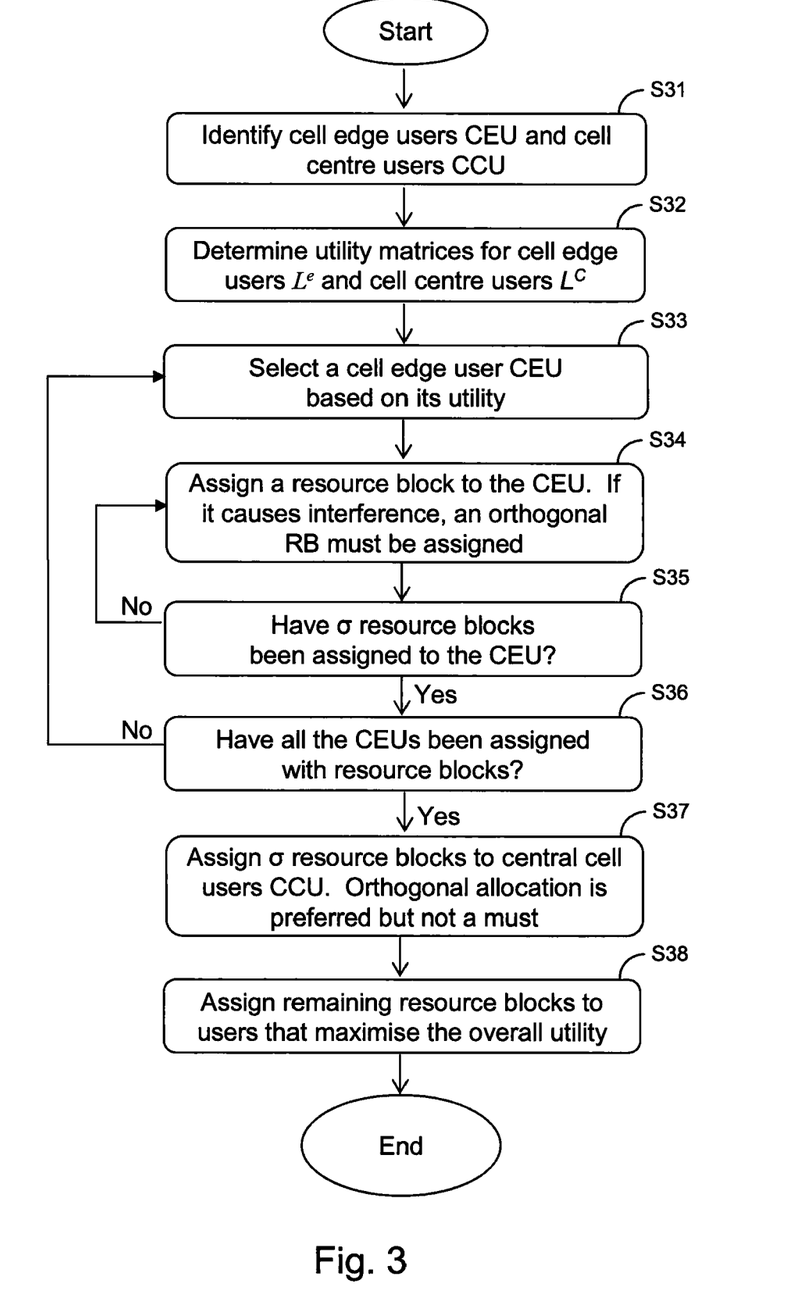
FIG. 3 shows a flow-chart of steps implemented in the embodiment of FIG. 2.

An example of pseudo code suitable for implementing the present embodiment is shown in Algorithm 1 in FIG. 2 and summarised in the flow chart of FIG. 3. The method begins by identifying which user devices are edge users and which users are central users (step S31). A matrix $L^e$ is generated that lists a set of values $R_{(i,j)}{}^k$. Each value $R_{(i,j)}{}^k$ in the matrix $L^e$ defines the utility of an edge cell user i in cell j when assigning a particular resource block k to that user (i.e. the achievable transmit rate of that user when the user is allocated the resource block in question). A similar matrix $L^C$ is generated for the cell centre users (step S32).

At line 14 of Algorithm 1 in FIG. 2, a particular edge user is selected (step S33) and a matrix L* for that user is initialised, L* being the utility array of user $U_{(i^*,j^*)}$ for all N resource blocks. At the same time, a value for a is determined, σ being the minimum number of resource blocks that must be assigned to each user.

At line 18 of the algorithm, the resource block k* that provides the edge user in question $U_{(i^*,j^*)}$ with the highest utility $R_{(i^*,j^*)}{}^{k*}$ is identified. A check is made to see if the cell j* in which the edge user is located is potentially a DDNIC for any other cells and if so, whether the resource block k* has been assigned in any one of those other cells. If not, (i.e. j∉$U^{Inf}$), then the resource block k* can be assigned to the user $U_{(i^*,j^*)}$. If the resource block k* does conflict with one that has already been assigned by a neighbouring cell, then the resource block having the next highest utility that does not conflict with a neighbouring cell is selected (Step S34). The selected utility value is removed from the matrix L* and the value of a decreased by 1. The process then repeats until the user in question $U_{(i^*,j^*)}$ has been allocated a number of resource blocks equal to σ (Step S35). Thereafter, a new edge user is identified and the process repeated, until all edge users have been allocated σ resource blocks (Step S36). Once each edge user has been allocated a resource blocks, the cell centre users are now allocated a resource blocks in a similar fashion (Step S37).

Once a blocks have been allocated to each centre user, the remaining resource blocks (N−σ×Ω) are allocated to those users (either edge users or centre users) that will provide the maximum overall utility (Step S38).

When allocating resource blocks to the cell centre users (step S37 in FIG. 3), it is non-essential to ensure that the allocated resource blocks are orthogonal to those assigned to edge users in neighbouring cells. There are two reasons for this. First, the number of available resourced blocks will be limited (N is a finite number) and it may not be able to form a fully staggered RB allocation for all users. Secondly, if a centre user causes interference to an edge user, an adaptive power control can be used to mitigate this problem, as discussed in the second embodiment below.

A second embodiment is now described in which an adaptive power control method is utilized to select suitable power levels for cell centre users to increase average user throughput. The second embodiment relies on the fact that a cell centre user will usually have a much higher SINR compared with a cell edge user. Consequently, a decreased transmission power can be chosen that will provide sufficiently good data transmission for the cell centre user but with much less interference to the edge user.

In the present embodiment, a resource block or subcarrier wise adaptive power allocation mechanism is used to provide an optimized transmission power for cell centre users. An objective function F is proposed to select suitable power levels with two aims, namely to achieve a high user fairness and to increase average user throughput. The objective function F can be defined as follows:

$$F = \max_{\tilde{p} \in P}\left(\alpha \times \left(\min_{j \in M} R_{(i,j)}^{\tilde{p}}\right) + \frac{\sum_{j \in M} R_{(i,j)}^{\tilde{p}}}{M}\right) \quad \text{(Equation 4)}$$

where $R_{(i,j)}{}^{\tilde{p}}$ is the utility of user i in cell j by using power level $\tilde{p}$ and P is the total number of available power levels for cell j.

The first of the terms used in Equation 4 above $$\max_{\tilde{p} \in P}\left(\min_{j \in M} R_{(i,j)}^{\tilde{p}}\right)$$

aims to increase the data rate of the user that has the lowest utility among the M cells. The second term selects the power level that is able to achieve a higher total average. Hence, the adaptive power allocation method not only considers user fairness but also aims to improve the total cell utility. The constant α is a weighting parameter.

In practice, the operation of the power allocation method may be K-step based, where K is the total number of transmission power levels available for the system. For example, in an initial step, the base station may use the same transmission power for all its users. Then, at each one of several stages, the transmission power of the centre user may be decreased by one level. The corresponding user utilities (data rate) of the centre users as well as its adjacent edge users are fed back to the controller to calculate F for the present power level. The final power level is then selected by considering which level results in the highest value of F.

Figure 4:
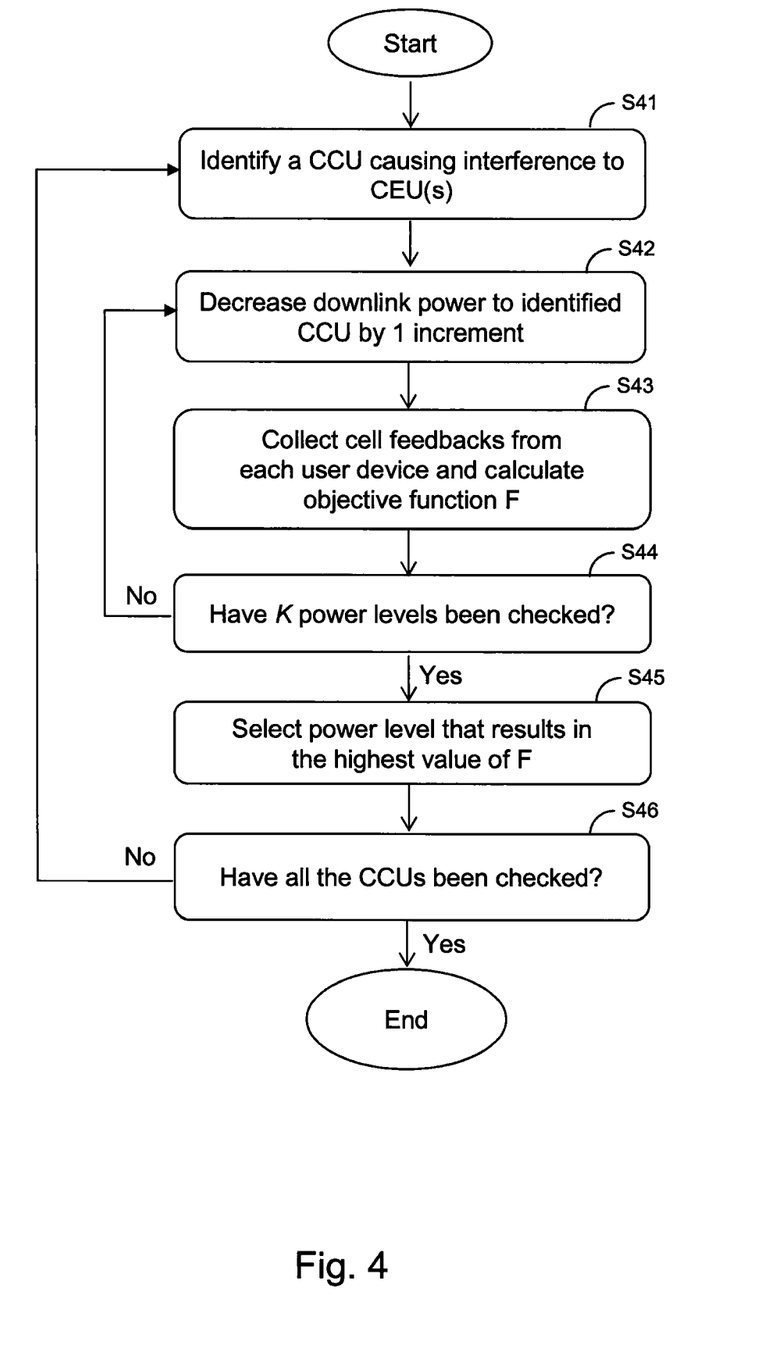
FIG. 4 shows a flow-chart of steps implemented in a second embodiment.

FIG. 4 shows a flow chart for implementing a scheme according to the second embodiment. The process begins by identifying a cell centre user CCU that is causing interference to a cell edge user (step S41). Next, the power with which the base station transmits to the cell centre user is decreased by an increment (step S42). At this point, cell feedbacks are collected from each device and input to the objective function F to calculate a value of F at the power level in question (step S43). The process is then repeated for each one of K power levels (step S44), after which the power level that provides the highest value for the objective function F is selected (step S45). The process then repeats for each remaining cell centre user.

Figure 5:
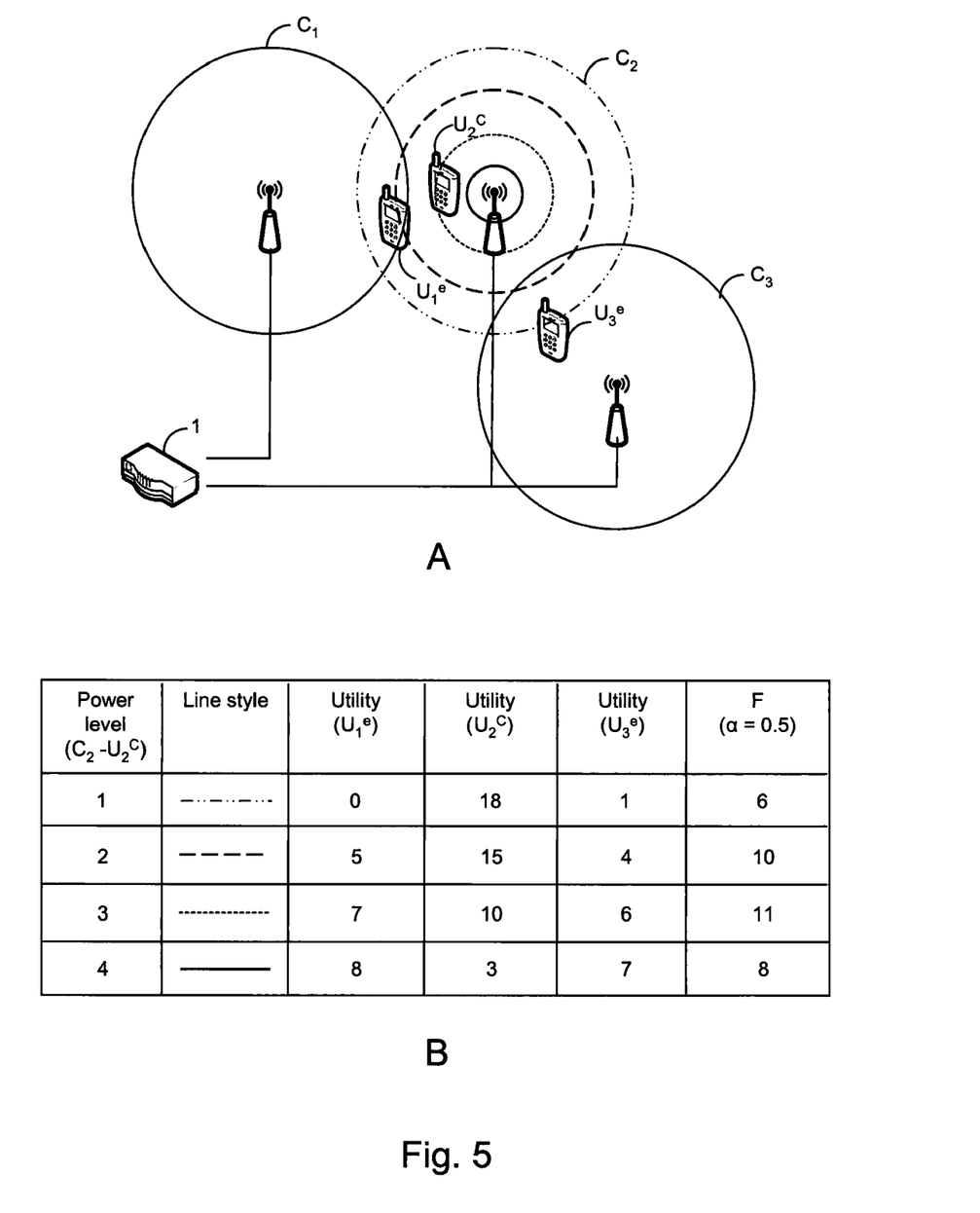
FIG. 5A shows an example of a cellular network in which different power levels are used for transmissions between a base station located in one of the cells and a user device in accordance with the second embodiment.
FIG. 5B shows an example of how the different power levels shown in FIG. 5A influence the utility of devices located in neighbouring cells of the network.

FIG. 5 shows a simple example of how the second embodiment may work in practice. Referring to FIG. 5A, a cell centre user $U_2{}^C$ in cell $C_2$ is allocated the same resource block as cell edge user $U_1{}^e$ in cell $C_1$ and also as $U_3{}^e$ in cell $C_3$. When the downlink transmission power of $U_2{}^C$ is decreased, the utility of $U_1{}^e$ and $U_3{}^e$ increases as they experience less interference from the base station of cell $C_2$. As shown in the table of FIG. 5B, power level 3 is finally chosen as providing the best value for F i.e. the best compromise between user fairness and total cell throughput. (Note that the utility numbers shown in the example have been selected for purpose of illustration only).

Thus, the adaptive power allocation scheme of the second embodiment uses a suitable transmission power level to transmit to cell centre users in order to achieve an appropriate balance between user fairness and the total cell throughput.

Figure 6:
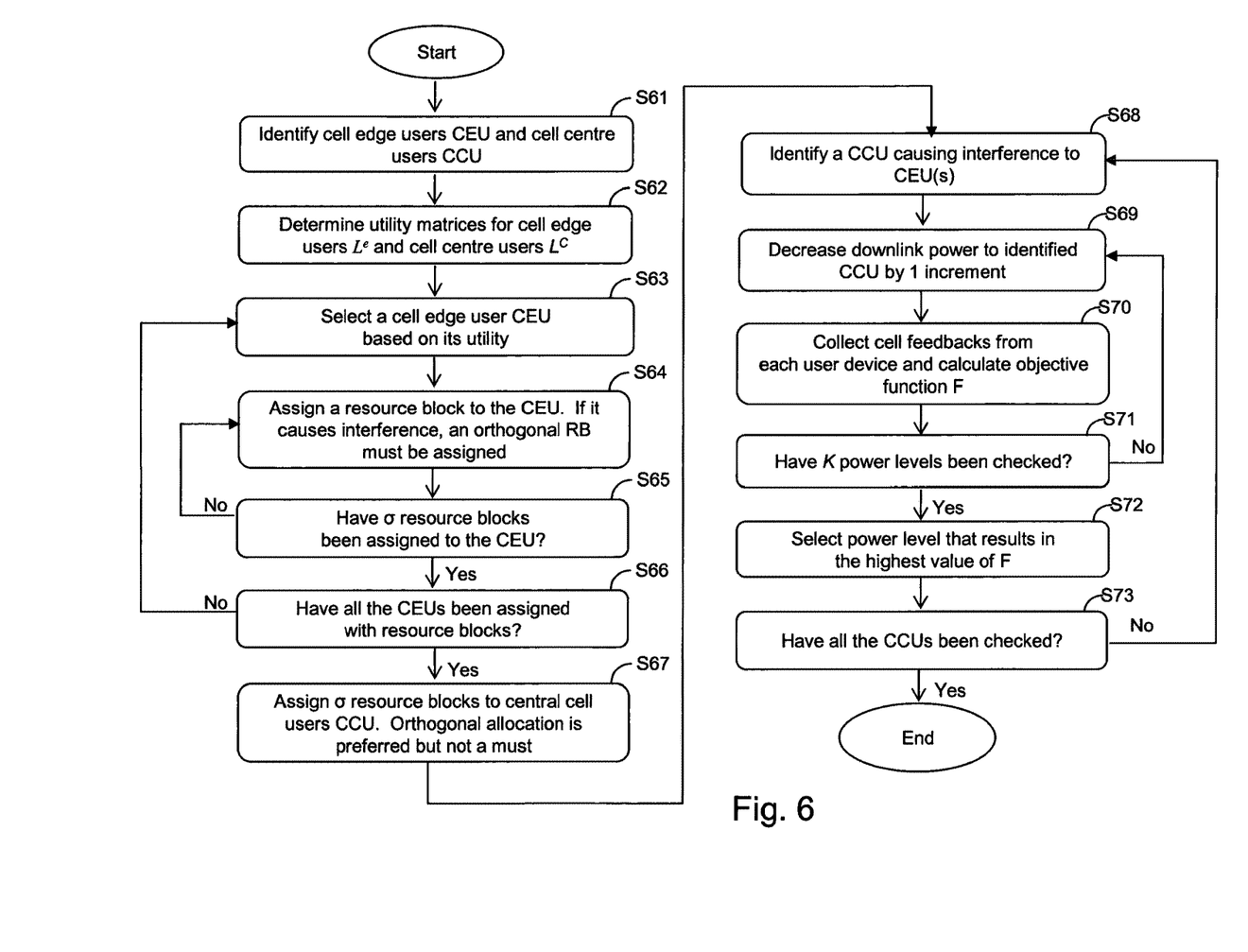
FIG. 6 shows a flow-chart of steps implemented in a third embodiment.

A third embodiment will now be described that combines the features of the first and second embodiments. The steps of this embodiment are shown schematically in the flow chart of FIG. 6. As can be seen, the initial steps S61-S67 are the same as those used in the first embodiment. In this case, once each of the resource blocks have been assigned (step S67), the method continues by implementing the steps of the second embodiment, namely, adjusting the power supplied to the cell centre users in order to mitigate interference to the edge cell users (steps S68-S73).

In the third embodiment, the interference caused by the cell centre users is mitigated by adjusting the power of transmissions to those users. Given this, it is non-essential to ensure that cell centre users are allocated orthogonal resources to users in neighbouring cells; the power of transmission can instead be adjusted such that the signal strength of those transmissions is negligible towards the edge of the cell and so does not cause interference to users located near those edges.

Figure 7:
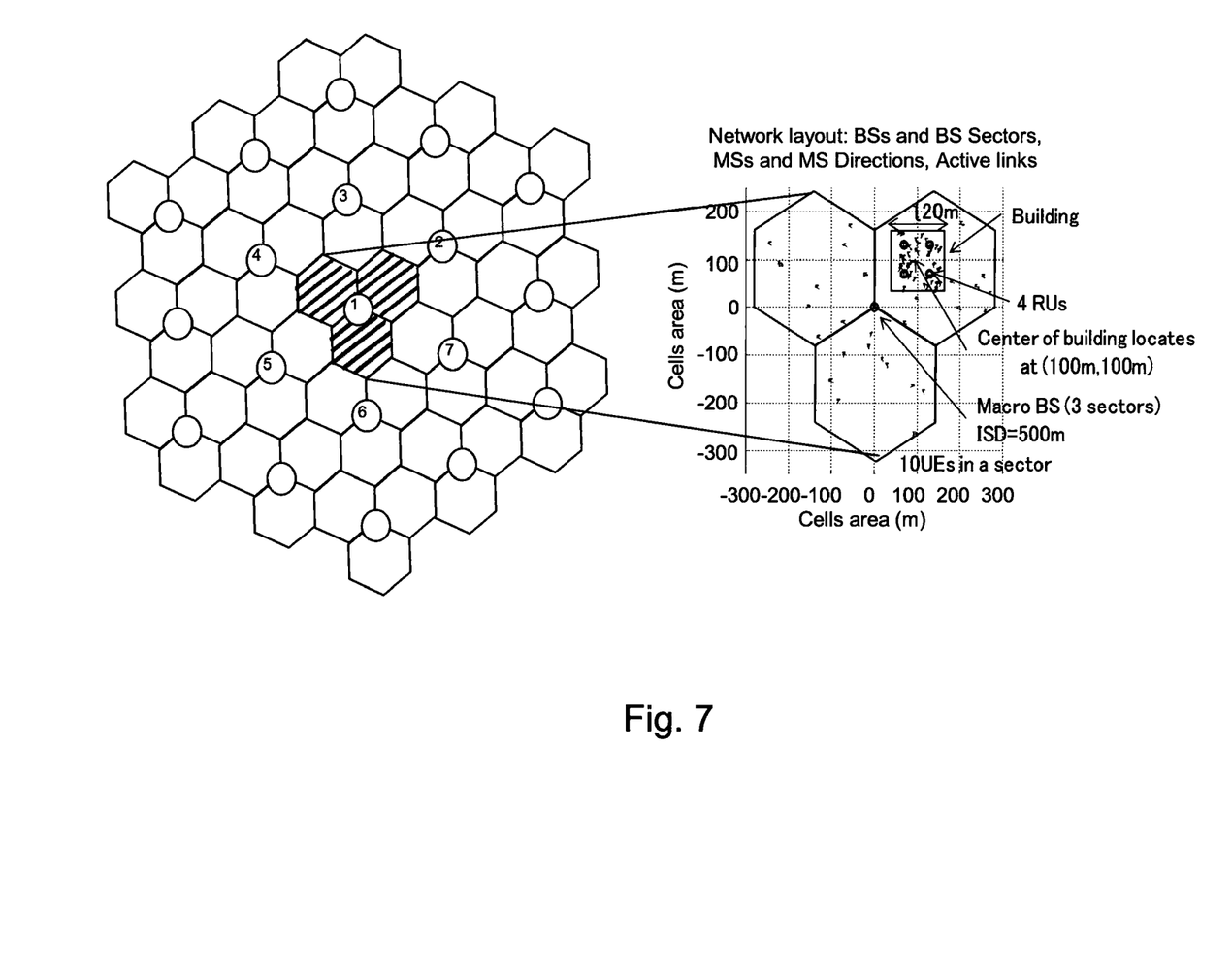
FIG. 7 shows a model of a network used to simulate the performance of a method in accordance with an embodiment.

System evaluations were carried out to study the performance of the method according to the third embodiment. For simulation setup, the network is modelled with 19 macro cells as shown in FIG. 7. Each macro cell has 3 sectors, the inter site or macro base station BS distance (ISD) being 1732 meters. In each sector, there are 4 small base stations BS located at the central macro cell. Each small BS is equipped with 2 transmitting antennas. There are assumed to be 15 users in each small BS, each user being equipped with 2 receiving antennas. The MRC MIMO receiver is assumed. About 20%-30% of the small BS users are assumed to be cell edge users.

Figure 8:
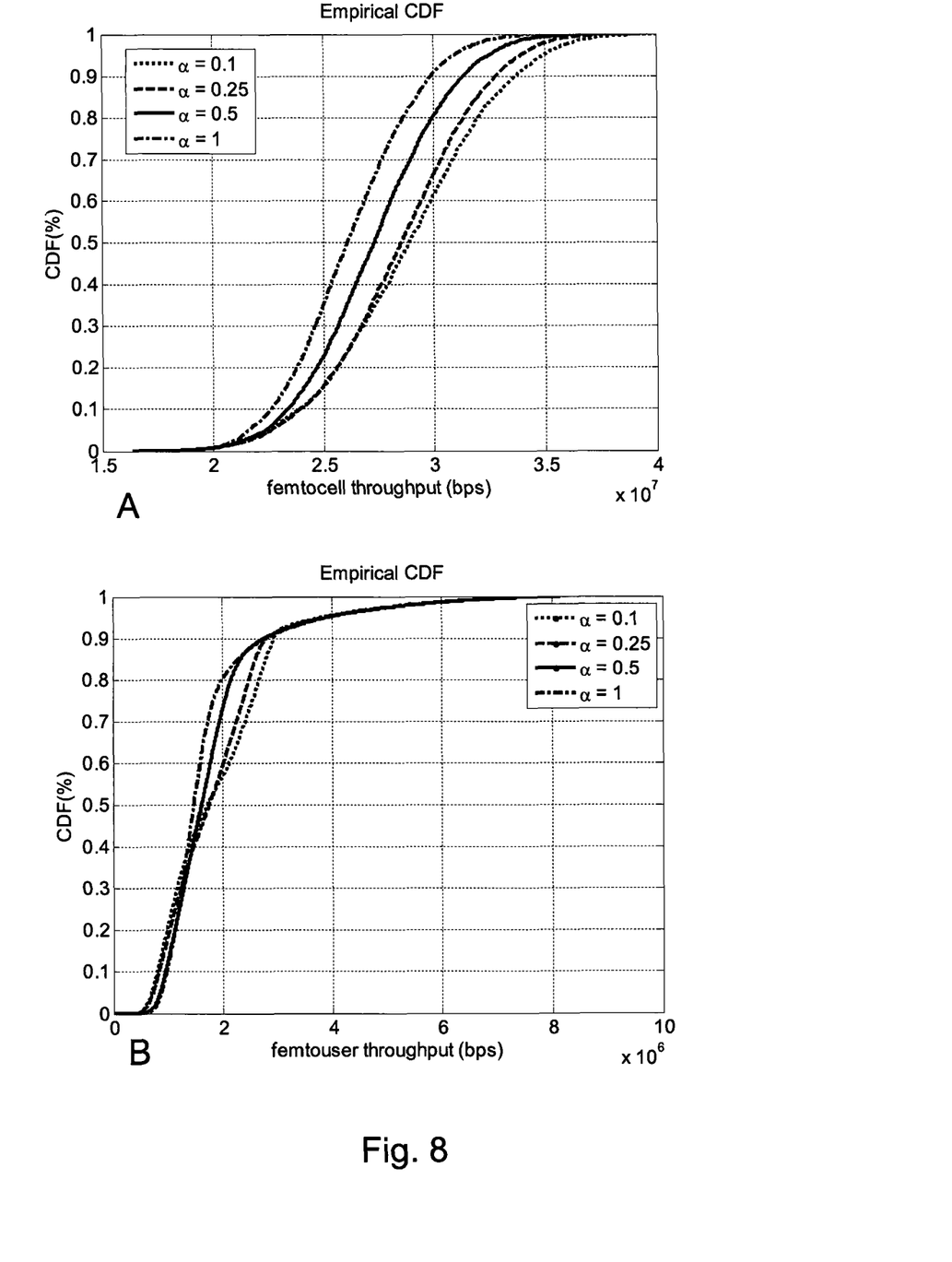
FIG. 8 shows results of simulations of the system throughout when using a method according to an embodiment.

FIG. 8A shows the impact to system throughput by choosing different values for the weighting parameter $\alpha$. A smaller value of $\alpha$ places less importance on the user fairness compared to total throughput. When the value of $\alpha$ increases, user fairness becomes more important than total throughput, and a decrease in total cell throughput can be observed. In contrast, referring to FIG. 8B, the user throughput curve slope becomes steeper when the value of $\alpha$ increases, which indicates a higher user fairness.

Figure 9:
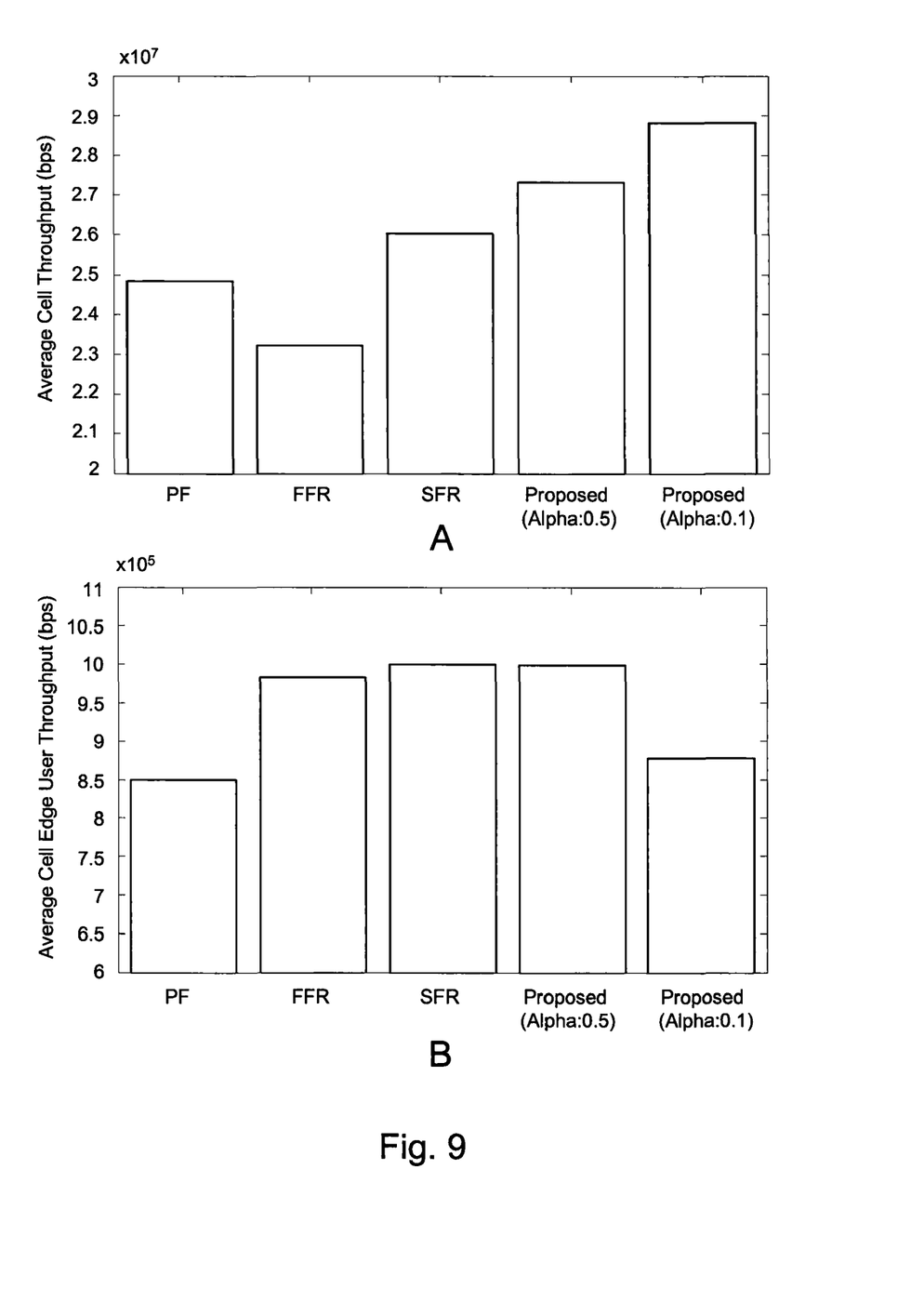
FIG. 9A shows results of simulations of the average cell throughout when using a method according to an embodiment.
FIG. 9B shows results of simulations of the average cell edge user throughput when using a method according to an embodiment.

In order to evaluate the proposed algorithm, the Proportional Fair (PF) algorithm, Fractional Frequency Reuse (FFR) and Soft Frequency Reuse (SFR) are chosen as competitors. FIGS. 9A and 9B show the average cell throughput and the average cell edge user throughput, respectively, for each technique. It can be seen from FIG. 9A that the proposed algorithm can achieve a higher total cell throughput when the weighting parameter $\alpha$ is set to 0.1 compared to 0.5. However, the proposed algorithm performs 24.1% ($\alpha$=0.1) and 17.6% ($\alpha$=0.5) better compared to FFR, and 10.7% ($\alpha$=0.1) and 5% ($\alpha$=0.5) better compared to SFR. On the other hand, when a large $\alpha$ value (0.5) is used, the proposed algorithm also performs the best against PF, FFR and SFR in terms of average cell edge use throughput, which can be seen from FIG. 9B.

Figure 10:
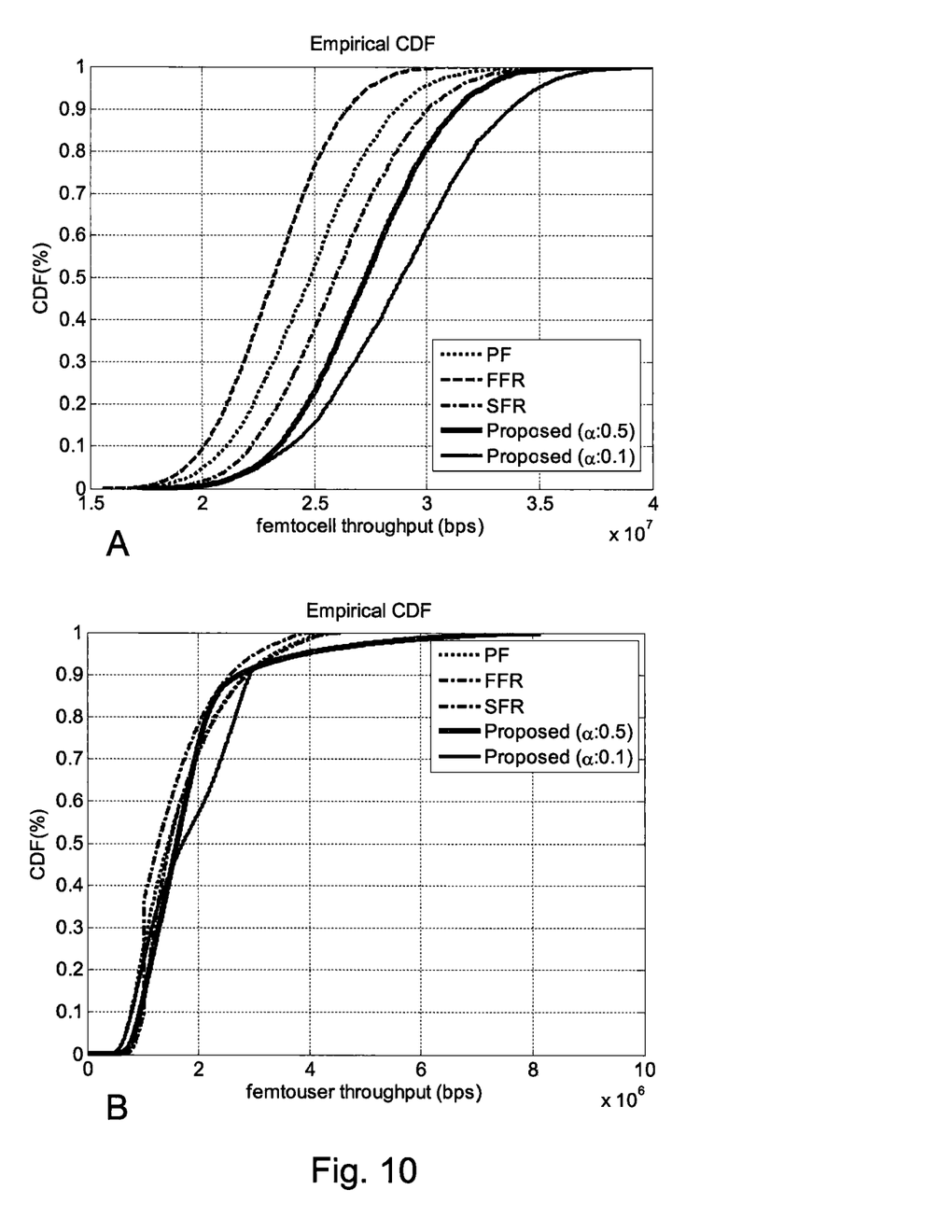
FIG. 10A shows results of simulations of the cell throughout when using a method according to an embodiment.
FIG. 10B shows results of simulations of the cell edge user throughput when using a method according to an embodiment.

FIGS. 10A and 10B illustrate the system performance of cell throughput and user throughput, respectively, in terms of Cumulative Distribution Function (CDF). Here, it can be seen that the method of the present embodiment provides a remarkable improvement of the user throughput compared to the other techniques. Also, in terms of user fairness, the present embodiment performs much better compared to PF and achieves similar edge user fairness compared to FFR and SFR.

Thus, embodiments described herein aim to assign equal number of resource blocks to each user, hence guarantying a minimum service level to all users. Coordinated RB allocation is applied for cell edge users, which is able to mitigate major inter-cell interference from adjacent cells. Embodiments compare favourably with previous approaches that focus on increasing the sum of total cell throughput.

While certain embodiments have been described, these embodiments have been presented by way of example only, and are not intended to limit the scope of the invention. Indeed, the novel methods, devices and systems described herein may be embodied in a variety of forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

The invention claimed is:

1. A method of allocating a radio resource block to a user device located in a cell of a cellular network, the cell having a first base station, the method comprising:
    identifying a plurality of edge user devices that are within range of the first base station, the edge user devices being ones located at an edge region of the cell and being identified by comparing a signal power received by the device from the first base station and from a neighbouring base station;
    identifying, from the plurality of edge user devices, a first edge user device with which the first base station intends to communicate and a second edge user device that is presently communicating with a second base station located in a neighbouring cell, the first edge user device being one of a plurality of first identified edge user devices within range of the first base station and with which the first base station intends to communicate;
    allocating a communication channel to each of the first edge user devices by assigning a respective resource block for communications between each first edge user device and the first base station; and
    allocating a communication channel to a center user device located at a center of the cell by assigning a respective resource block for communications between the center user device and the first base station, wherein
    for each of the first edge user devices, the resource block that is assigned is selected as being the one that will provide the highest transmission rate for the first edge user device in question, whilst differing from any resource blocks already allocated for communication between the second edge user device and the second base station,
    each of the first edge user devices is assigned a plurality of resource blocks in turn, and
    the center user device is allocated a same resource block as the second edge user device.

2. A method according to claim 1, wherein
    the second edge user device is one of a plurality of second identified edge user devices that are within range of the first base station and presently communicating with base stations located in neighbouring cells; and
    the resource block that is assigned for communication between the first edge user device and the first base station is selected as being the one that will provide the highest transmission rate for the first edge user device, whilst differing from any resource blocks already assigned for communication between the second edge user devices and the respective base stations with which the second edge user devices are presently communicating.

3. A method according to claim 2, wherein for each first user device, the resource blocks are chosen in turn, each block being chosen as the one that will provide the greatest increase in transmission rate for the first edge user device whilst differing from any resource blocks already assigned for communication between the second edge user devices and the base stations with which the second edge user devices are presently communicating.

4. A method according to claim 3, wherein each one of the first devices is first assigned the same minimum number of resource blocks, and thereafter, any remaining available resource blocks are assigned to those devices located in the cell that will yield the highest net transmission for the cell.

5. A method according to claim 2, wherein the second edge user devices are identified as those devices for which the difference in power received from the respective base station with which they are presently communicating and the power received from the first base station is below a predetermined threshold level.

6. A method according to claim 2, further comprising:
 identifying at least one of the second edge user devices that is presently communicating with a base station located in a neighbouring cell using the same resource block; and
 adjusting the power of transmissions between the central user device and the first base station so as to reduce the interference caused by the transmissions at the second user device.

7. A method according to claim 1, wherein each resource block is a sub-carrier in an OFDM system.

8. A method of mitigating interference experienced by a user device in a cellular network, the method comprising:
 allocating a communication channel to a first user device located in a cell of the network by assigning a resource block for communications between the user device and a first base station that serves the cell, the first user device being a central user device located in a central region of the cell;
 allocating a communication channel to a center user device located at a center of the cell by assigning a respective resource block for communications between the center user device and the first base station;
 identifying at least one other user device that is located in an edge region of the cell and which is presently communicating with a second base station located in a neighbouring cell using the same resource block; and
 adjusting the power of transmissions between the first user device and the first base station so as to reduce the interference caused by the transmissions between the first user device and the first base station at the at least one other user device presently communicating with the second base station, wherein
 the power of transmission between the first user device and the first base station is varied through a plurality of levels,
 for each level, a performance criterion is determined, the performance criterion being based on the transmission rates of each user device presently within range of the first base station,
 the method further comprises selecting the power level that results in the best value for the performance criterion, and
 the center user device is allocated a same resource block as the at least one other user device.

9. A method according to claim 8, wherein the power of transmission is varied incrementally from a maximum value to a minimum value.

10. A method according to claim 8, wherein at each power level, the performance criterion is determined at least in part based on the mean transmission rate of each user device presently within range of the first base station.

11. A method according to claim 8, wherein the performance criterion is determined at least in part based on the transmission rate of the user device having the lowest transmission rate of all user devices presently within range of the first base station.

12. A method according to claim 11, wherein the performance criterion comprises a weighted sum of the mean transmission rate of each user device presently within range of the first base station and the transmission rate of the user device having the lowest transmission rate of all user devices presently within range of the first base station.

13. A controller for allocating a radio resource block to a user device located in a cell of a cellular network, the cell having a first base station, the controller comprising:
 a processor programmed to:
 identify a plurality of edge user devices that are within range of the first base station, the edge user devices being ones located at an edge region of the cell and being identified by comparing a signal power received by the device from the first base station and from a neighbouring base station;
 identify, from the plurality of edge user devices, a first edge user device with which the first base station intends to communicate and a second edge user device that is presently communicating with a second base station located in a neighbouring cell, the first edge user device being one of a plurality of first identified edge user devices within range of the first base station and with which the first base station intends to communicate;
 allocate a communication channel to each of the first edge user devices by assigning a respective resource block for communications between each first edge user device and the first base station; and
 allocate a communication channel to a center user device located at a center of the cell by assigning a respective resource block for communications between the center user device and the first base station, wherein
 for each of the first edge user devices, the allocating includes selecting the resource block that will provide the highest transmission rate for the first edge user device in question, whilst differing from any resource blocks already allocated for communication between the second edge user device and the second base station,
 each of the first edge user devices is assigned a plurality of resource blocks in turn, and
 the center user device is allocated a same resource block as the second edge user device.

14. A controller for controlling the power of transmissions between a base station and a user device in a cellular network, the controller comprising:
 a processor programmed to:
 allocate a communication channel to a first user device located in a cell of the network by assigning a resource block for communications between the user device and a first base station that serves the cell, the first user device being a central user device located in a central region of the cell;
 allocate a communication channel to a center user device located at a center of the cell by assigning a respective resource block for communications between the center user device and the first base station;

identify at least one other user device that is located in an edge region of the cell and which is presently communicating with a second base station located in a neighbouring cell using the same resource block; and adjust the power of transmissions between the first user device and the first base station so as to reduce the interference caused by the transmissions between the first user device and the first base station at the at least one other user device presently communicating with the second base station, wherein the power of transmission between the first user device and the first base station is varied through a plurality of levels, for each level, a performance criterion is determined, the performance criterion being based on the transmission rates of each user device presently within range of the first base station, the controller is further configured to select the power level that results in the best value for the performance criterion, the center user device is allocated a same resource block as the at least one other user device.

15. A non-transitory computer readable storage medium comprising computer executable instructions that when executed by a computer will cause the computer to implement a method of allocating a radio resource block to a user device located in a cell of a cellular network, the cell having a first base station, the method comprising:

identifying a plurality of edge user devices that are within range of the first base station, the edge user devices being ones located at an edge region of the cell and being identified by comparing a signal power received by the device from the first base station and from a neighbouring base station;

identifying, from the plurality of edge user devices, a first edge user device with which the first base station intends to communicate and a second edge user device that is presently communicating with a second base station located in a neighbouring cell, the first edge user device being one of a plurality of first identified edge user devices within range of the first base station and with which the first base station intends to communicate;

allocating a communication channel to each of the first edge user devices by assigning a respective resource block for communications between each first edge user device and the first base station; and allocating a communication channel to a center user device located at a center of the cell by assigning a respective resource block for communications between the center user device and the first base station, wherein for each of the first edge user devices, the resource block that is assigned is selected as being the one that will provide the highest transmission rate for the first edge user device in question, whilst differing from any resource blocks already allocated for communication between the second edge user device and the second base station, each of the first edge user devices is assigned a plurality of resource blocks in turn, and the center user device is allocated a same resource block as the second edge user device.

* * * * *